June 21, 1927.

R. W. B. SPARKES 1,632,931

OPENING, MIXING, AND BLENDING COTTON AND OTHER FIBROUS MATERIALS

Filed June 13, 1924   2 Sheets-Sheet 1

Inventor:
R. W. B. Sparks
By Langner, Parry, Card & Langner
Attys

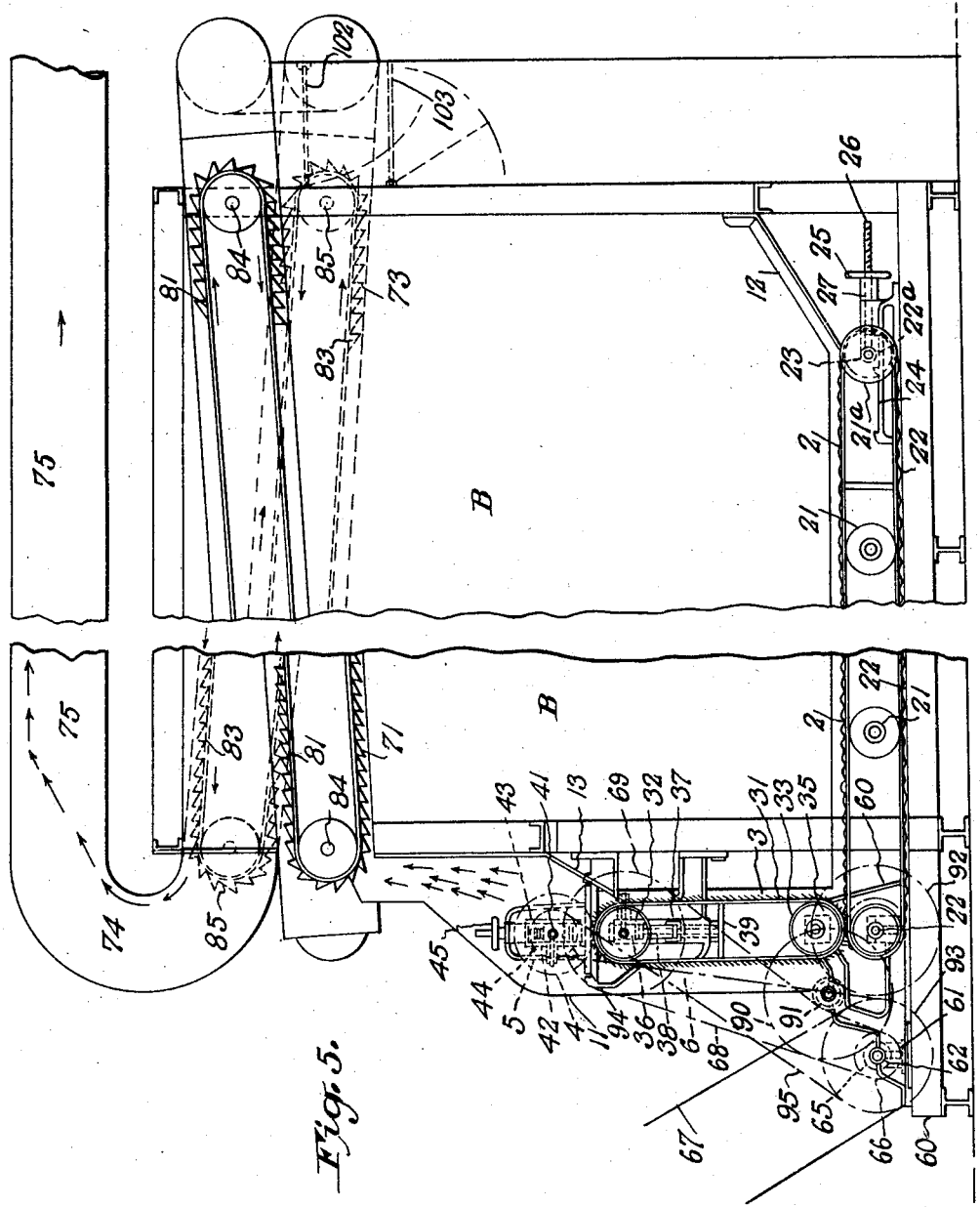

Patented June 21, 1927.

1,632,931

UNITED STATES PATENT OFFICE.

ROBERT WILLIAM BELL SPARKES, OF BOLTON, ENGLAND.

OPENING, MIXING, AND BLENDING COTTON AND OTHER FIBROUS MATERIALS.

Application filed June 13, 1924, Serial No. 719,900, and in Great Britain June 13, 1923.

This invention relates to the opening and mixing and/or blending of cotton and other fibrous materials and it relates particularly to the preparatory treatment of such material prior to its being passed through a hopper feeder or other apparatus adapted to bring the material from the state in which it consists of a more or less homogeneous mass into one in which it is more suitable for subsequent treatment.

The chief object of the present invention is to provide an improved method of and apparatus for effecting the loosening and mixing or intermingling of the fibers of the material, whether only one kind or quality is being treated or whether several kinds or qualities are being simultaneously loosened and blended together, and this without the use of a number of machines and without repeated handling. A further object is to remove and collect a considerable proportion of the dust and other foreign materials that are invariably present in cotton and other fibrous materials before treatment.

According to this invention the material is treated discontinuously in batches each of which is subjected to the repeated action of suitable mechanical mixing appliances until the fibers have become loosened and intermingled to the required degree. By continuing this mixing a sufficient length of time the material may be brought to a very loose state in which the fibers are thoroughly intermingled and, if two or more kinds or qualities of material are being dealt with, the various fibers are thoroughly blended.

For the purpose of this invention mechanical mixing appliances are enclosed within a casing or chamber, and the arrangement is such that the material during treatment is caused to come repeatedly within the range of operation of the mixing appliances so that it is subjected repeatedly to the action of the said appliances. In one construction the mechanical appliances comprise a slow-moving horizontal feed-lattice arranged parallel to the floor of the chamber and a more rapidly moving spiked mixing lattice, the latter being arranged preferably vertically at one end of the chamber and being adapted to act upon material carried to it by the feed-lattice, which may be without spikes.

The invention will now be described with reference to the accompanying drawings which illustrate, by way of example, two embodiments of the apparatus according to this invention for opening, mixing, and blending cotton and other fibrous materials.

In the said drawings

Figure 1:
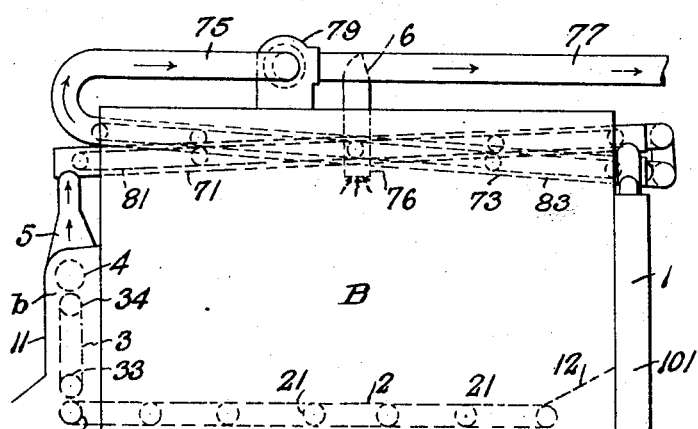
Figure 1 is a longitudinal section.
Figure 3:
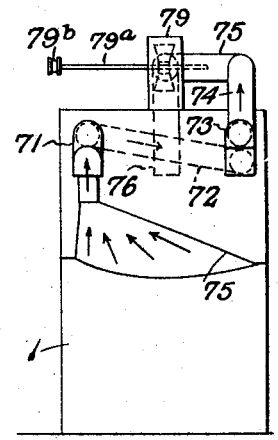
Figure 4:
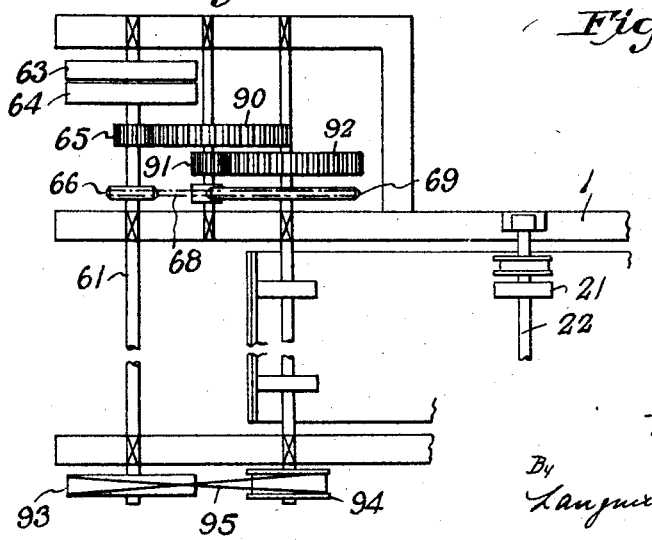
Figure 6:
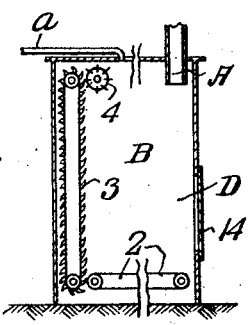

Figure 3 an end view of one construction of the said apparatus;

Figures 4 and 5 are respectively a plan and a side elevation, both in section, showing details of the mechanism for driving the mechanical mixing appliances as shown diagrammatically in Figure 1; and Figure 6 is a sectional elevation of a modification.

Like reference characters indicate like parts throughout the drawings.

First, referring more particularly to Figures 1 to 5, 1 is a main casing, 2 is a feed lattice, 3 is a mixing lattice, 4 is a beater or bladed doffer roller, 5 is a canopy leading to a system of suction trunks, and 6 are dust chambers.

The feed lattice 2 is arranged horizontally and parallel to the floor of the casing 1; it is mounted upon rollers 21 carried by shafts 22, one of the said shafts ($22^d$) being the driving shaft; and it is without spikes and is driven at a slow speed—for example, at about 18 ft. per minute. The roller $21^A$ remote from the driving shaft is carried by a shaft $22^a$ mounted in bearings 23, which are adjustable upon brackets 24 by means of a hand-wheel 25 upon a screw 26 having one end secured to the sliding bearing 23 and the other passing through a tapped sleeve 27 anchored to the bracket 24. By this means the tension of the feeding lattice 2 may be adjusted.

The mixing lattice 3 is mounted upon shafts 31, 32 carrying wheels 33, 34 and respectively mounted in bearings 35, 36. The bearings 35 are fixed in brackets 60 and the bearings 36 are adjustable vertically in their slides 37 by means of screws 38 actuated by hand wheels 39, thus permitting the tension of the lattice 3 to be adjusted.

The bladed doffer roller or beater 4 is carried by a shaft 41 mounted in bearings 42, which are adjustable vertically in their slides 43 by a screw 44 operated by a hand-wheel 45.

Figure 2:
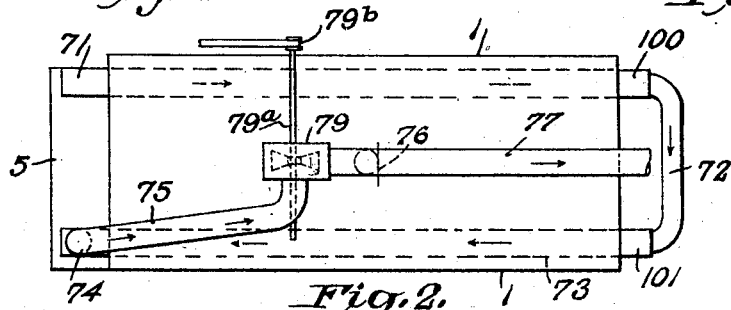
Figure 2 is a plan.

The mixing or uptake lattice 3 and the bladed roller 4 are mounted at one end of the chamber B formed by the main casing 1 and in an extension $b$ formed by a prolongation 11 the top of which constitutes the canopy 5. The said canopy is narrowed in an upward direction and is shaped to lead to a suction trunk 71 passing backward through the chamber B and at one side of same; it then is continued by a cross trunk 72, which in turn is connected by a return trunk 73 which is bent upward and inward as at 74 to constitute a discharge trunk 75. A fan 79 is fitted into the said discharge trunk 75, to produce the flow of air from the canopy 5 and through the trunks 71, 72, 73, 75 to discharge pipes 76 or 77. The rotating member of the fan is mounted on a shaft $79^a$ carrying a pulley $79^b$ to enable the fan to be driven by a belt (Figures 2 and 3). The discharge pipe 76 is directed (Figures 1 and 2) above the centre of the feed lattice 1; and the discharge pipe 76, which is only used to empty the chamber B of material, may lead to another machine—such, for example, as an opener—in which the material is to receive further treatment. A valve plate 6 is hinged at the junction of the discharge pipes 76, 77 (Figure 1) and is manipulated to cause the material to pass into the required discharge pipe.

The trunks 71 and 73 made with their bottoms flat and are each fitted with an endless lattice 81, 83 carried by rollers 80, 82, on shafts 84, 85, and driven in the directions indicated by the arrows. Dust, seed, leaf, and other foreign materials fall from the material on to the lattice 81 and lodge between the lags or laths thereof until the right hand end of the apparatus (Figure 5) when, as the lattice passes around the end roller 80 the said foreign matter falls on to a hinged door 102 of the dust chamber 100. The said door is normally closed by a spring (not shown) but when the weight of foreign matter becomes excessive, the pressure of the spring is overcome, the door opens, and the said impurities pass into the dust chamber 100. In the case of the trunk 73 and the lattice 83 the said impurities are deposited upon the bottom of the trunk—which is made flat (Figure 3)—and are scraped along towards the right hand end (Figure 5) when they fall on to a door 103 of a dust chamber 101, the door 103 being mounted in a manner similar to the door 102, as described above.

The lattices 2 and 3 and the beater 4 are all driven from a common shaft 61 mounted in a bearing 62 carried by the bracket 60. 63, 64 are fast and loose pulleys, 65 is a pinion, and 66 is a pulley, all mounted on the shaft 61. Rotary motion is received from any convenient source by the fast pulley 63 from a belt 67 and this motion is transmitted to the feed lattice 2, and mixing lattice 3, and the beater 4. The transmission to the feed lattice 2 is effected through reducing spur gearing 90, 91, 92 to the shaft $22^d$; to the mixing lattice, it is effected by a chain 68 connecting a chain wheel 66 to a chain wheel 69 on the shaft 32 and passing over a jockey pulley 96 on the shaft 91; and to the beater 4, it is effected by a crossed belt 95 connecting a pulley 93, on the shaft 61 at the front of the machine (Figure 4), with a pulley 94 on the shaft 41. This gearing is such that the shaft $22^d$ is geared down, whilst the shafts 32 and 41 are geared up, and the final difference between the speeds of the lattices 2 and 3 may be considerable, for example 1:10.

Within the chamber B stop boards 12, 13 are fitted.

In the construction illustrated in Figure 6 the pneumatic portion of the apparatus is dispensed with and the whirling action of the beater 4 is relied upon to throw the material back on to the feed lattice 2 after it has been under the action of the mixing or uptake lattice 3. Since in this construction there is no means for automatically discharging the mixed material this operation must be performed manually and for this purpose a door D is utilized.

In carrying out the invention the material is placed within the chamber B upon the feed lattice 2 and, if two or more qualities or kinds of material are to be mixed or blended, portions of each quality or kind are preferably added, if two, or successively, if more than two; thus, when a complete batch has accumulated within the chamber the material may be in strata or layers upon the feed lattice 2. The movement of the latter carries the material against the inner face of the spiked uptake lattice 3, which carries upward portions of each stratum or layer of the material towards the top of the extension $b$ of the chamber, where the rotating blades of the doffer roller or beater 4 remove the material from the part of the chamber adjacent to the top of the lattice 3 and throw it upward into the canopy 5 where it comes under the influence of the suction and is drawn into the trunks 71 . . . 75. As soon as the material reaches the trunk 71 it is carried along by the creeping lattice 81 and during its progress various impurities fall through the lattice on to the floor of the trunk and pass into the dust chamber 6 as described above. In this manner the material passes along the trunk 73 and thence to the trunk 75, through the fan 79 and the outlet 76 back to the bulk of the batch resting on the feed lattice 2.

In Figures 1, 2, 3, and 5 the direction taken by the material in passing through the trunks is indicated by arrows.

Whilst the mechanical mixing chamber is described above as being closed, it is not essential that the closure be complete; for example, as shown in Figure 6, an inlet fitted with a pipe A extending downward some distance into the chamber B may be provided in the top or roof and the complete closing of the said inlet pipe is not necessary, although, in some cases it may be desirable. Usually it is only necessary to close the chamber to an extent sufficient to prevent the material from escaping until the treatment by the mechanical mixing appliances has been completed.

In addition to the system of suction trunks 71 . . . 75, suitable openings may be provided in the walls, roof, or floor of the chamber and may lead to ducts communicating with fans either to assist the process, or to remove dust, or both. In the form shown in Figure 6, $a$ is an air passage leading from the roof of the chamber B to a fan (not shown) by which some of the dust may be removed from the chamber.

The material treated in the apparatus described above may be obtained from the ordinary bale breaker and placed—either by hand or with the assistance of one or more lattices—within the mixing chamber through an inlet pipe—such as A (Figure 6)—or through a door (D, Figure 6) in one of the vertical walls. In some cases, however, the bale breaker may be dispensed with, the bale or bales being placed within the chamber B unbroken, for treatment; in such cases the construction of the mechanical mixing appliances may be modified in the direction of increasing their strength.

Having described my invention what I claim and desire to secure by Letters Patent of the United States is:—

1. In apparatus for opening, mixing, and blending cotton and other fibrous materials the combination of a horizontal feed lattice, a spiked vertical lattice adapted to receive material from the feed lattice, a rotary doffer adapted to remove the material from the vertical lattice, air trunks leading from the vicinity of the doffer to the feed lattice the said trunks being arranged with rectilinear portions, feed lattices mounted within the said rectilinear portions of the air trunks, and means for producing a flow of air in the trunks.

2. In apparatus for opening, mixing, and blending cotton and other fibrous materials the combination of a horizontal feed lattice, a spiked vertical lattice adapted to receive material from the feed lattice, mechanical means for detaching the material from the mixing lattice, air trunks leading from the vicinity of the doffer to the feed lattice the said trunks being arranged with rectilinear portions, feed lattices mounted within the said rectilinear portions of the air trunks and means for producing a flow of air in the trunks.

3. In apparatus for opening, mixing, and blending cotton and other fibrous materials the combination of a horizontal feed lattice, a spiked vertical lattice adapted to receive material from the feed lattice, means for detaching the material from the mixing lattice, air trunks leading from the vicinity of the doffer to the feed lattice the said trunks being arranged with rectilinear portions, feed lattices mounted within the said rectilinear portions of the air trunks, and means for producing a flow of air in the trunks.

4. In apparatus for opening, mixing, and blending cotton and other fibrous materials the combination of a horizontal feed lattice, a vertical lattice to which material is fed by the horizontal lattice, means upon the vertical lattice whereby the material fed by the horizontal lattice is engaged and carried upward, means adapted to detach the material from the engaging means upon the vertical lattice, air trunks leading from the vicinity of the doffer to the feed lattice the said trunks being arranged with rectilinear portions, feed lattices mounted within the said rectilinear portions of the air trunks, and means for producing a flow of air in the trunks.

5. In apparatus for opening, mixing, and blending cotton and other fibrous materials the combination of a horizontal feed lattice, a spiked vertical lattice adapted to receive the material from the feed lattice, means for detaching the material from the mixing lattice, air trunks leading from the said detaching means to discharge outlets one above the feed lattice and the other without the apparatus the said trunks being constructed with rectilinear portions, feed lattices mounted within the said rectilinear portions of the air trunks, means whereby the said discharge outlets may be used alternatively, and means for producing a flow of air in the trunks.

6. In apparatus for opening, mixing, and blending cotton and other fibrous materials the combination of a horizontal feed lattice, a vertical lattice to which material is fed by the horizontal lattice, means upon the vertical lattice whereby the material fed by the horizontal lattice is engaged and carried upward, means adapted to detach the material from the engaging means upon the vertical lattice, air trunks leading from the said detaching means to discharge outlets one above the feed lattice and the other without the apparatus the said trunks being constructed with rectilinear portions, feed lattices mounted within the said rectilinear portions of the air trunks, means whereby the said discharge outlets may be used alternatively, and means for producing a flow of air in the trunks.

7. In apparatus for opening, mixing, and blending cotton and other fibrous materials the combination of a main chamber, a horizontal feed lattice mounted within the main chamber; an extension chamber opening from the main chamber; a lattice mounted vertically within the extension chamber; means upon the vertical lattice whereby the material fed by the horizontal lattice is engaged and carried upward; means, situated within the extension chamber, and adapted to detach the material from the said engaging means; a canopy situated above the detaching means; air trunks leading from the canopy to the feed lattice; and means for producing a flow of air into the canopy and through the said trunks.

8. In apparatus for opening, mixing, and blending cotton and other fibrous materials the combination of a main chamber, a horizontal feed lattice mounted within the main chamber; an extension chamber opening from the main chamber; a lattice mounted vertically within the extension chamber; means upon the vertical lattice whereby the material fed by the horizontal lattice is engaged and carried upward; means, situated within the extension chamber, and adapted to detach the material from the said engaging means; a canopy situated above the detaching means, air trunks leading from the said canopy and comprising a discharge trunk adapted to return the material to the feed lattice, and an alternative discharge trunk adapted to carry the material out of the apparatus; a valve adapted to control the passage of the material into one or the other of the discharge trunks so that they may be used alternatively; and means for producing a flow of air into the canopy and through the said trunks.

9. In apparatus for opening, mixing, and blending cotton and other fibrous materials the combination of a main chamber, a horizontal feed lattice mounted within the main chamber; an extension chamber opening from the main chamber; a lattice mounted vertically within the extension chamber; means upon the vertical lattice whereby the material fed by the horizontal lattice is engaged and carried upward, means, situated within the extension chamber, and adapted to detach the material from the said engaging means; a canopy situated above the detaching means; air trunks leading from the canopy to the feed lattice, the said trunks being arranged with rectilinear portions; feed lattices mounted within the said rectilinear portions of the air trunks; and means for producing a flow of air into the canopy and through the said trunks.

10. In apparatus for opening, mixing, and blending cotton and other fibrous materials the combination of a main chamber, a horizontal feed lattice mounted within the main chamber; an extension chamber opening from the main chamber; a lattice mounted vertically within the extension chamber; means upon the vertical lattice whereby the material fed by the horizontal lattice is engaged and carried upward; means, situated within the extension chamber, and adapted to detach the material from the said engaging means; a canopy situated above the detaching means; air trunks leading from the said canopy and comprising rectilinear portions, a discharge trunk adapted to return the material to the feed lattice, and an alternative discharge trunk adapted to carry the material out of the apparatus; a valve adapted to control the passage of the material into one or the other of the discharge trunks enabling them to be used alternatively; feed lattices mounted within the said rectilinear portions of the air trunks; and means for producing a flow of air into the canopy and through the said trunks.

11. In apparatus for opening, mixing and blending cotton and other fibrous materials the combination of a main chamber, a horizontal feed lattice mounted within the main chamber; an extension chamber opening from the main chamber; a lattice mounted vertically within the extension chamber; means upon the vertical lattice whereby the material fed by the horizontal lattice is engaged and carried upward; means, situated within the extension chamber, and adapted to detach the material from the said engaging means; a canopy situated above the detaching means; air trunks leading from the canopy to the feed lattice, the said trunks being arranged with rectilinear portions; feed lattices mounted within the said rectilinear portions of the air trunks; means adapted to receive impurities from the material passed through the trunks, said receiving means being in communication with the trunks; and means for producing a flow of air into the canopy and through the said trunks.

12. In apparatus for opening, mixing, and blending cotton and other fibrous materials the combination of a main chamber, a horizontal feed lattice mounted within the main chamber; an extension chamber opening from the main chamber; a lattice mounted vertically within the extension chamber; means upon the vertical lattice whereby the material fed by the horizontal lattice is engaged and carried upward; means, situated within the extension chamber, and adapted to detach the material from the said engaging means; a canopy situated above the detaching means; air trunks leading from the canopy to the feed lattice, the said trunks being arranged with rectilinear portions; feed lattices mounted within the said rectilinear portions of the air trunks; a plurality of chambers adapted to receive impurities separated from the material during its passage through the trunks; connecting means between the trunks and the dust chambers; and means for producing a flow of air into the canopy and through the said trunks.

13. In apparatus for opening, mixing, and blending cotton and other fibrous materials the combination of a main chamber, a horizontal feed lattice mounted within the main chamber; an extension chamber opening from the main chamber; a vertical lattice mounted within the extension chamber across the opening between the latter and the main chamber; means, situated within the extension chamber, and adapted to detach the material from the said engaging means; a canopy situated above the detaching means; air trunks leading from the canopy to the feed lattice, the said trunks being arranged with rectilinear portions; feed lattices mounted within the said rectilinear portions of the air trunks; and means for producing a flow of air into the canopy and through the said trunks.

14. In apparatus for opening, mixing, and blending cotton and other fibrous materials the combination of a main chamber, a horizontal feed lattice mounted within the main chamber; an extension chamber opening from the main chamber; a vertical lattice mounted within the extension chamber across the opening between the latter and the main chamber; means, situated within the extension chamber, and adapted to detach the material from the said engaging means; a canopy situated above the detaching means; air trunks leading from the said canopy and comprising rectilinear portions, a discharge trunk adapted to return the material to the feed lattice, and an alternative discharge trunk adapted to carry the material out of the apparatus; a valve adapted to control the passage of the material into one or the other of the discharge trunks enabling them to be used alternatively; feed lattices mounted within the said rectilinear portions of the air trunks; and means for producing a flow of air into the canopy and through the said trunks.

15. In apparatus for opening, mixing, and blending cotton and other fibrous materials the combination of a main chamber, a horizontal feed lattice mounted within the main chamber; an extension chamber opening from the main chamber; a vertical lattice mounted within the extension chamber across the opening between the latter and the main chamber; means, situated within the extension chamber, and adapted to detach the material from the said engaging means; a canopy situated above the detaching means; air trunks leading from the canopy to the feed lattice, the said trunks being arranged with rectilinear portions; feed lattices mounted within the said rectilinear portions of the air trunks; means adapted to receive impurities from the material passed through the trunks, said receiving means being in communication with the trunks; and means for producing a flow of air into the canopy and through the said trunks.

Dated this 18th day of March 1924.

ROBERT WILLIAM BELL SPARKES.